(12) United States Patent
Mason (10) Patent No.: US 12,326,264 B2
(45) Date of Patent: *Jun. 10, 2025

(54) HYDRONIC EXPANSION TANK ASSEMBLY

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,772

(22) Filed: Jul. 12, 2024

(65) Prior Publication Data

US 2024/0361006 A1    Oct. 31, 2024

Related U.S. Application Data

(63) Continuation of application No. 17/509,344, filed on Oct. 25, 2021.

(51) Int. Cl.
*F24D 3/10* (2006.01)
*F16K 11/087* (2006.01)
(Continued)

(52) U.S. Cl.
CPC .......... *F24D 3/1008* (2013.01); *F16K 11/087* (2013.01); *F16K 17/02* (2013.01); *F24D 3/1058* (2013.01); *F24D 3/1083* (2013.01); *F24D 19/1051* (2013.01); *E03B 7/12* (2013.01); *F24D 2220/046* (2013.01)

(58) Field of Classification Search
CPC .... F24D 3/1008; F24D 3/1058; F24D 3/1083; F24D 3/10; F24D 19/1051; F24D 19/1015; F24D 19/1066; F24D 2200/046; F24D 2200/0242; F24D 2200/0278; F24D 2200/0271; F16K 11/087; F16K 17/02; E03B 7/12; F16L 43/001; F16L 41/021; Y10T 137/87877; F24H 9/2007

See application file for complete search history.

(56) References Cited

U.S. PATENT DOCUMENTS

| | | |
|---|---|---|
| 8,375,991 B2 | 2/2013 | Erhardt |
| 9,546,475 B2 | 1/2017 | Lu |
| (Continued) | | |

FOREIGN PATENT DOCUMENTS

| | | |
|---|---|---|
| DE | 202014000877 | 2/2014 |
| RU | 2531717 | 10/2014 |

OTHER PUBLICATIONS

Watts, Thermal Expansion Products, http://media.wattswater.com/PG-ThermExpansion.pdf (2013).

*Primary Examiner* — Kelsey E Cary
(74) *Attorney, Agent, or Firm* — PRICE HENEVELD LLP (57) ABSTRACT

An isolation mounting arm for use with an expansion tank has a passageway with a first end portion, a second end portion, and a medial portion located between the first end portion and the second end portion with the drain port located at the terminal end of the second end portion. A first tee is located in the first end portion with oppositely disposed first and second ports. A second tee is located in the second end portion, with oppositely disposed fourth and fifth ports. A first valve member is coupled to the first port, a second valve member is coupled to the second port, and a third valve member is located adjacent to the drain port. An expansion tank is coupled to either the fourth port or the fifth port with a plug coupled to the other port.

20 Claims, 10 Drawing Sheets

(51) Int. Cl.
 *F16K 17/02* (2006.01)
 *F24D 19/10* (2006.01)
 *E03B 7/12* (2006.01)

(56) References Cited

U.S. PATENT DOCUMENTS

| | | |
|---|---|---|
| 10,208,875 B1 | 2/2019 | Zitting |
| 10,247,327 B2 | 4/2019 | Doughty et al. |
| 2016/0061350 A1 | 3/2016 | Pettinaroli |
| 2020/0080729 A1 | 3/2020 | Chromy |
| 2020/0240650 A1 | 7/2020 | Morita |
| 2020/0278066 A1 | 9/2020 | Andersson |
| 2021/0325212 A1 | 10/2021 | Lamport |

HYDRONIC EXPANSION TANK ASSEMBLY

CLAIM OF PRIORITY

The present application is a continuation application of commonly assigned, U.S. Pat. No. 12,066,196, issued Aug. 20, 2024, which is incorporated herein by reference and claim priority thereto under 35 U.S.C. § 120.

BACKGROUND OF THE INVENTION

The present invention relates to an expansion tank service assembly that is used in a hydronic heating system. Expansion tanks are designed to handle the thermal expansion of water as it heats up a plumbing system, preventing excessive water pressure. If the water pressure gets too high, it can damage valves and plumbing fixtures, joints in the supply pipes, and even the appliances or heating system components connected to the plumbing system. If a building has a check valve or pressure regulating valve on the system supply line, expansion tanks are typically needed and/or required by code, especially for hydronic heating systems. Even if not required by code, an expansion tank can still be a critical component of a hydronic heating system. The incorporation of an expansion tank into a hydronic heating system typically requires a drain valve near the expansion tank for purging the tank, a pressure gauge, and other components necessary to service and/or isolate the expansion tank. In addition, space can be limited within the building, making the positioning of the expansion tank difficult when space is limited.

An improved plumbing assembly that eliminates a number of potential leak paths due to multiple components, as well as providing the option for a bottom- or top-mount expansion tank, is described herein. In addition, the integral mounting bracket of the plumbing assembly allows the assembly to be installed on a wall or other vertical structure in order to support the weight of the plumbing assembly and expansion tank.

SUMMARY OF THE INVENTION

One aspect of the present invention is an expansion tank assembly. The expansion tank assembly includes a unitary body having a passageway with a first end portion, a second end portion, and a medial portion located between the first end portion and the second end portion. The unitary body includes a flange at the terminal end of the first end portion. A first tee is located in the first end portion of the unitary body with oppositely disposed first and second ports. The unitary body also has a third port located in the medial section and a drain port located at the terminal end of the second end portion. A second tee is located in the second end portion of the unitary body, with oppositely disposed fourth and fifth ports. The expansion tank assembly includes a first valve member coupled to the first port, a second valve member coupled to the second port, and a third valve member located adjacent to the drain port. An expansion tank is coupled to either the fourth port or the fifth port with a plug coupled to the other port. A pressure gauge is coupled to the third port of the unitary body.

Another aspect of the present invention is a plumbing assembly for a hydronic system that has an expansion tank. The plumbing assembly includes an isolation mounting arm having a fluid passageway with a first end portion, a second end portion, and a medial portion located between the first end portion and the second end portion. The isolation mounting arm has a mounting bracket at the terminal end of the first end portion and a first tee located in the first end portion with oppositely disposed first and second ports. The isolation mounting arm has a second tee located in the second end portion, with oppositely disposed fourth and fifth ports. A third port is located in the medial section and a drain port is located at the terminal end of the second end portion of the isolation mounting arm. The plumbing assembly includes a first valve member coupled to the first port, a second valve member coupled to the second port, and a third valve member adjacent to the drain port. The plumbing assembly includes a seal within the first end portion to seal the fluid passageway adjacent to the mounting bracket.

Yet another aspect of the present invention is a hydronic system that has a fluid supply line and a closed loop hydronic system. The hydronic system includes an isolation mounting arm with a fluid passageway having a first end portion, a second end portion, and a medial portion located between the first end portion and the second end portion. A first tee is located in the first end portion, the first tee including a first port which is coupled to the supply line to the hydronic system and an oppositely disposed second port coupled to the fluid supply line. The isolation mounting arm has a third port located in the medial portion and a drain port located at the end of the second end portion. The isolation mounting arm has a second tee located in the second end portion with oppositely disposed fourth and fifth ports. A first valve member is coupled to the first port, a second valve member is coupled to the second port, and a third valve member is adjacent to the drain port of the isolation mounting arm. An expansion tank is coupled to either the fourth or fifth ports on the second tee of the second end portion of the isolation mounting arm.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
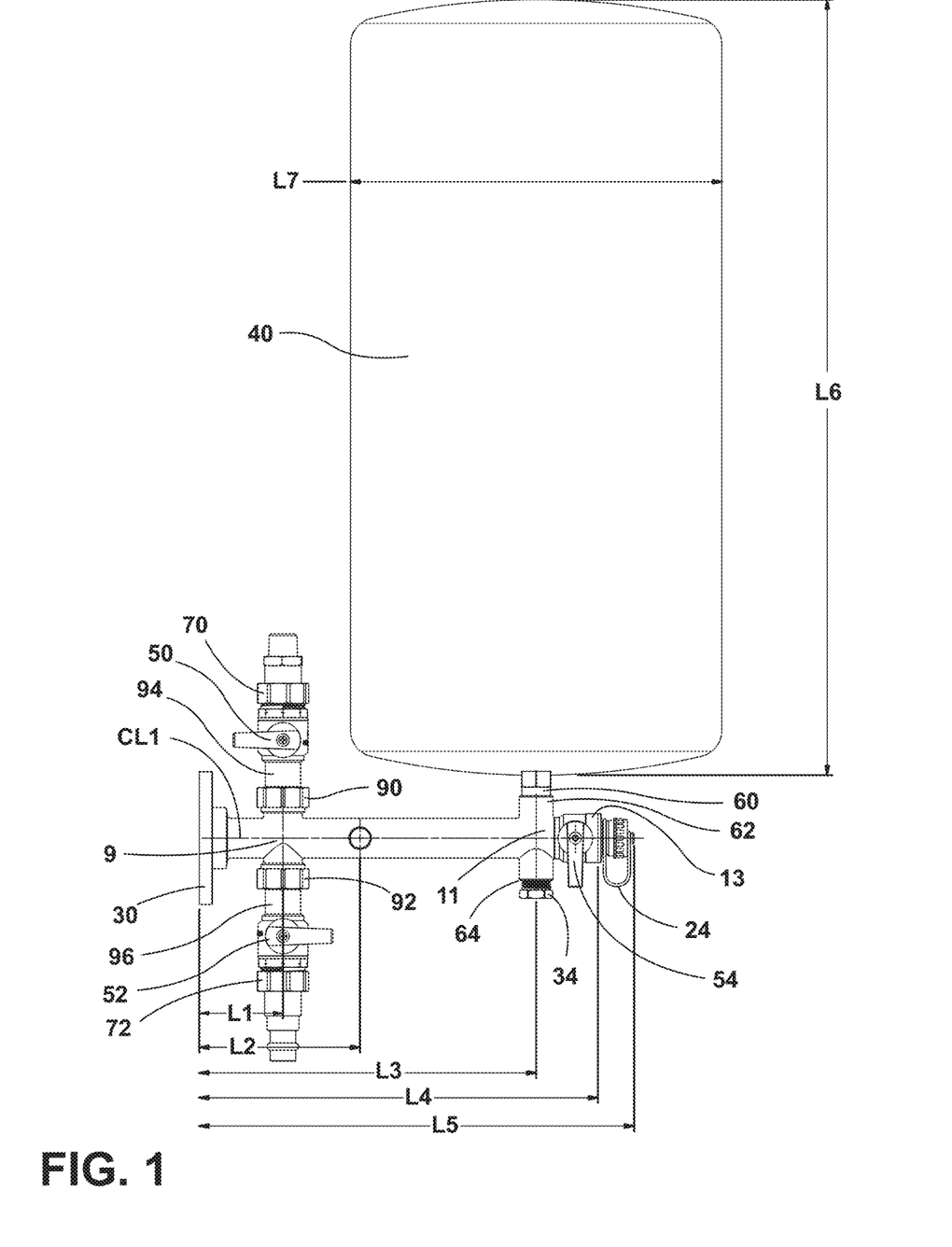
FIG. 1 is a front elevational view of a hydronic expansion tank assembly with the expansion tank installed in a top-mount position.
Figure 2:
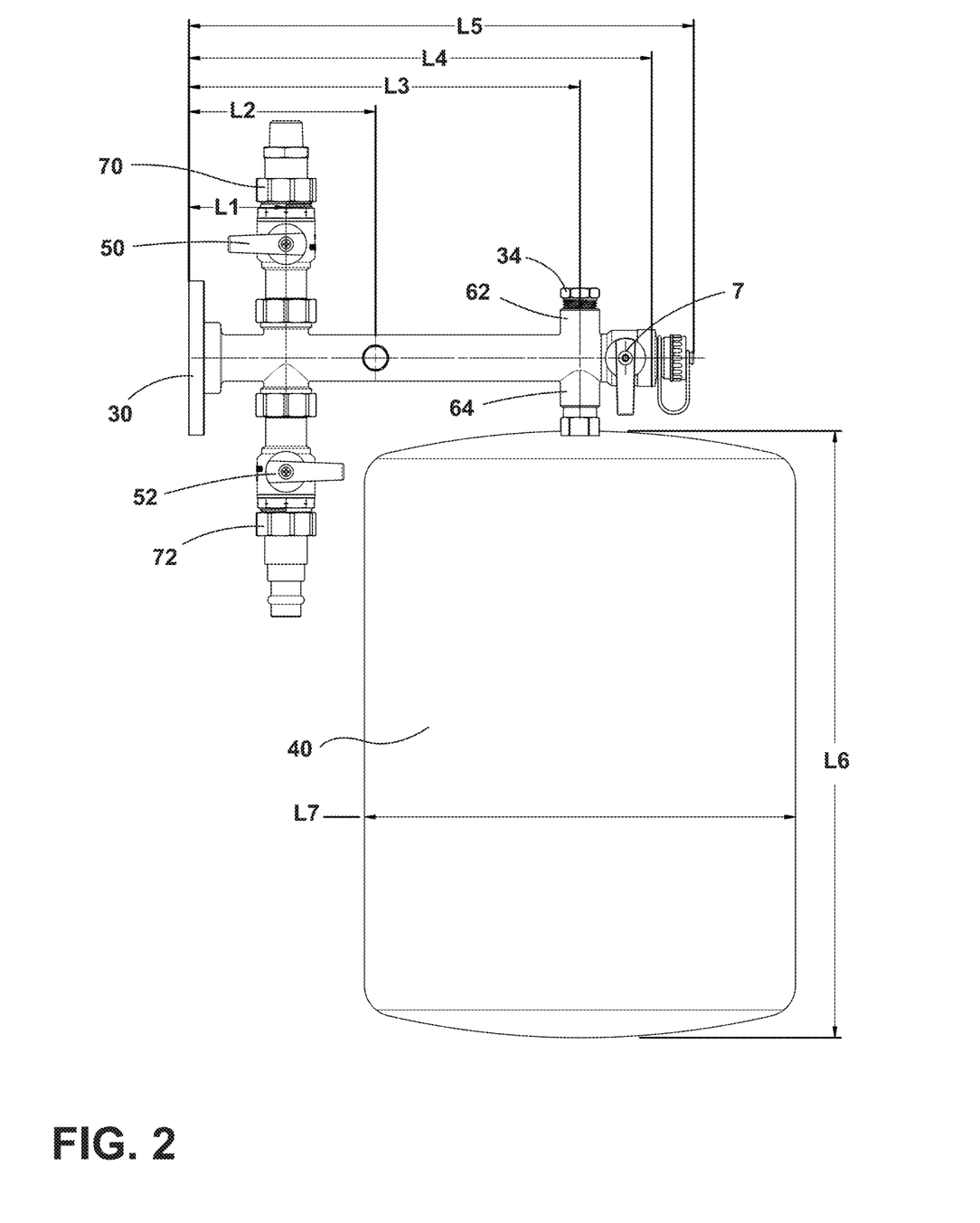
FIG. 2 is a front elevational view of the hydronic expansion tank assembly of FIG. 1 with the expansion tank installed in a bottom-mount position.
Figure 3:
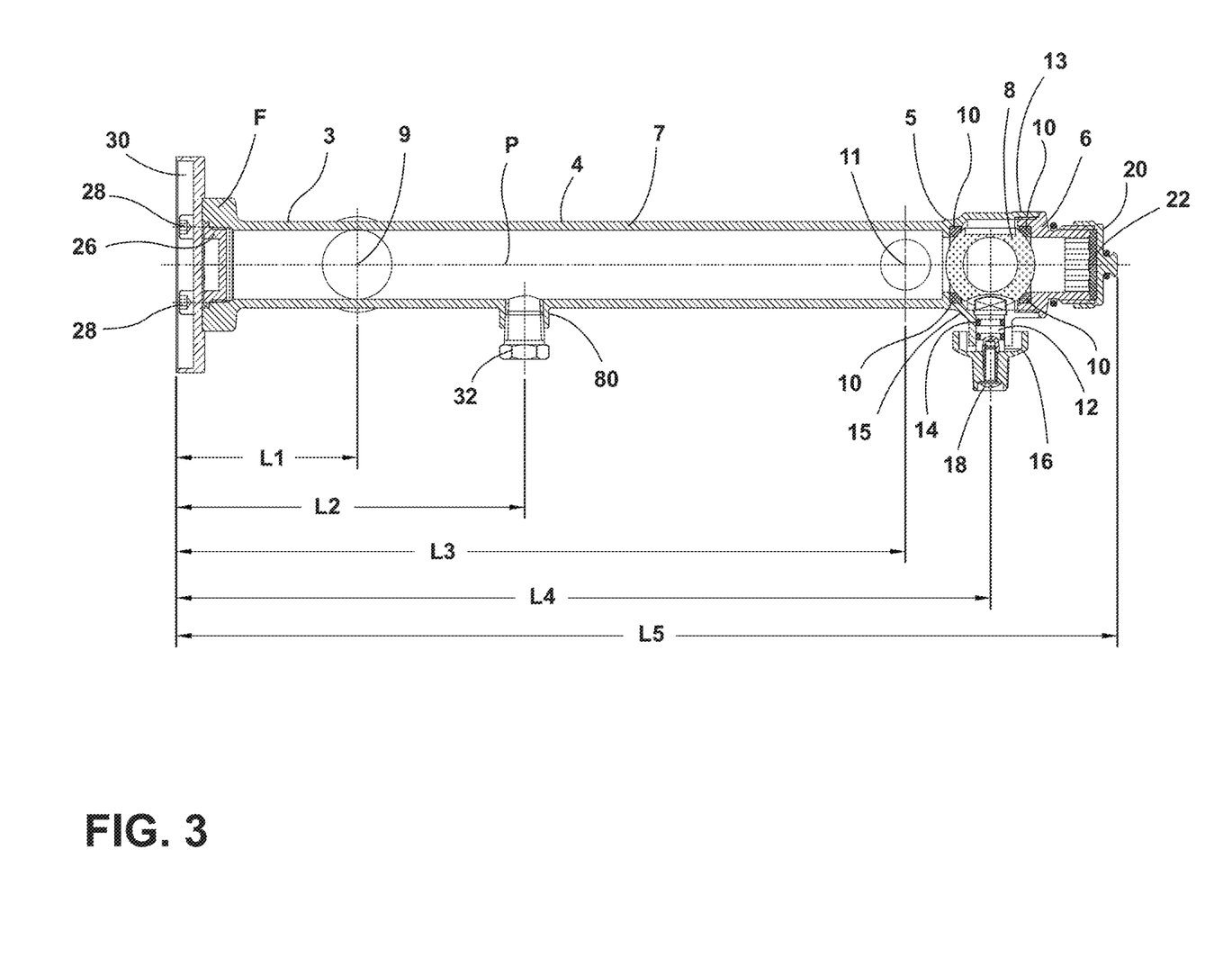
FIG. 3 is a cross-sectional view of the isolation mounting arm assembly.
Figure 4:
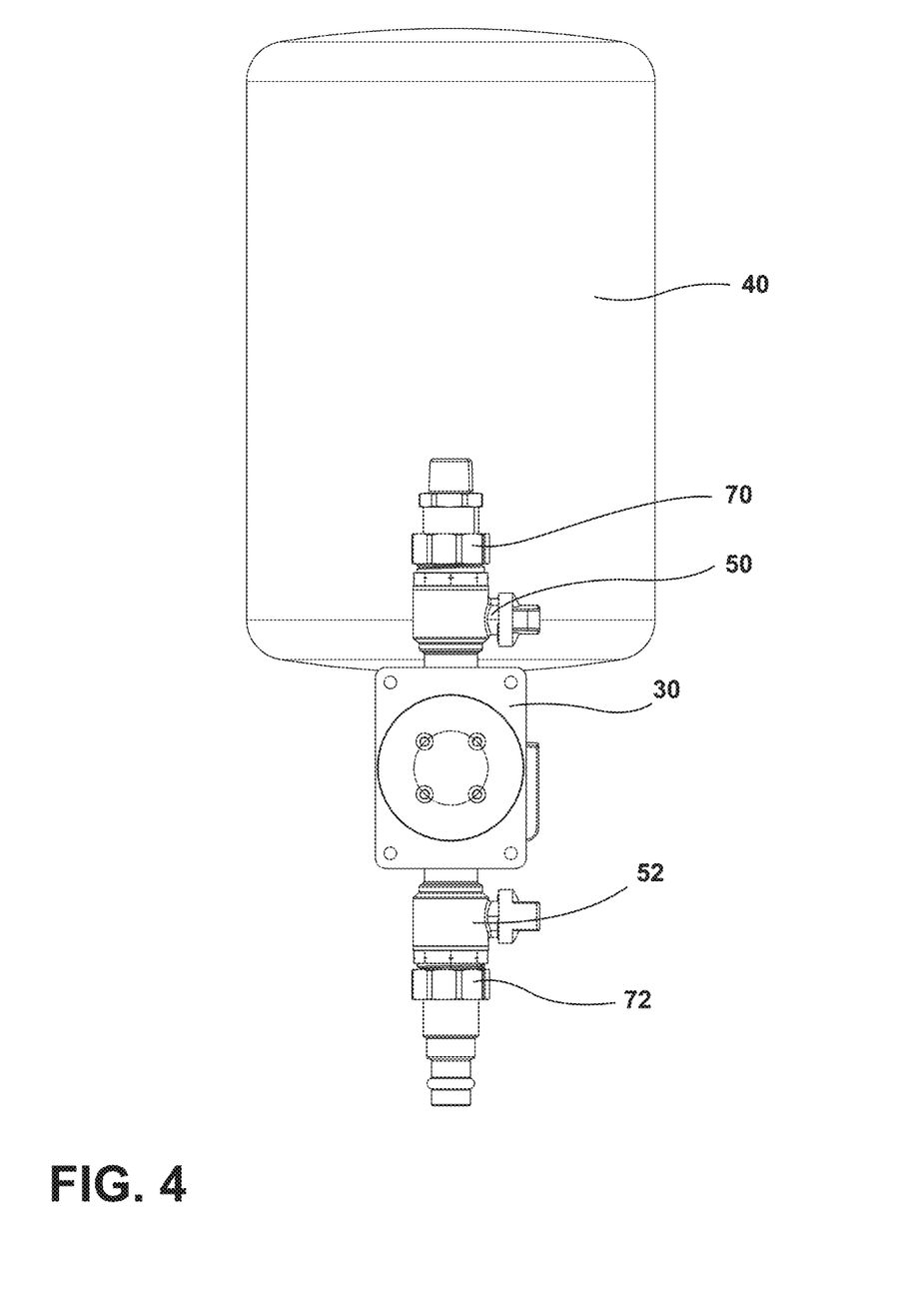
FIG. 4 is a side elevational view of the hydronic expansion tank assembly of FIG. 1.
Figure 5:
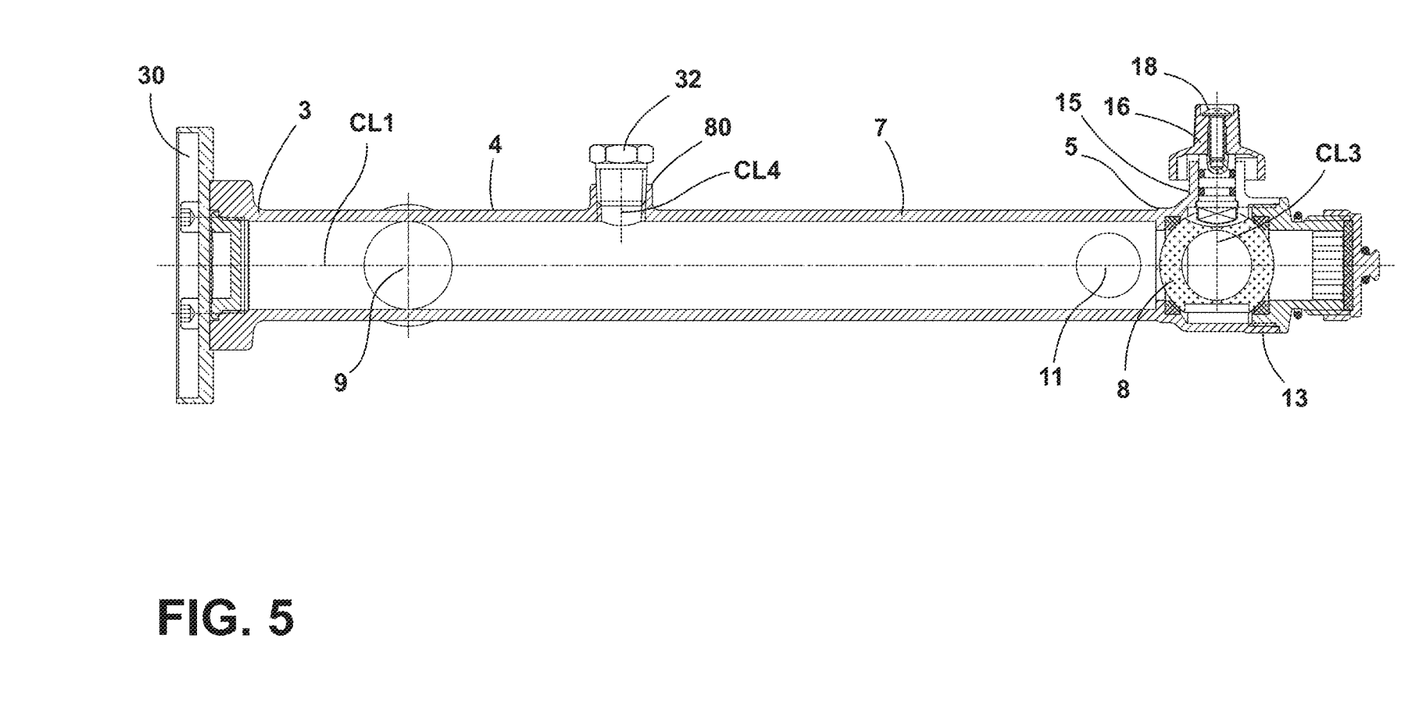
FIG. 5 is a rotated, cross-sectional view of the isolation mounting arm shown in FIGS. 1 and 2.
Figure 6:
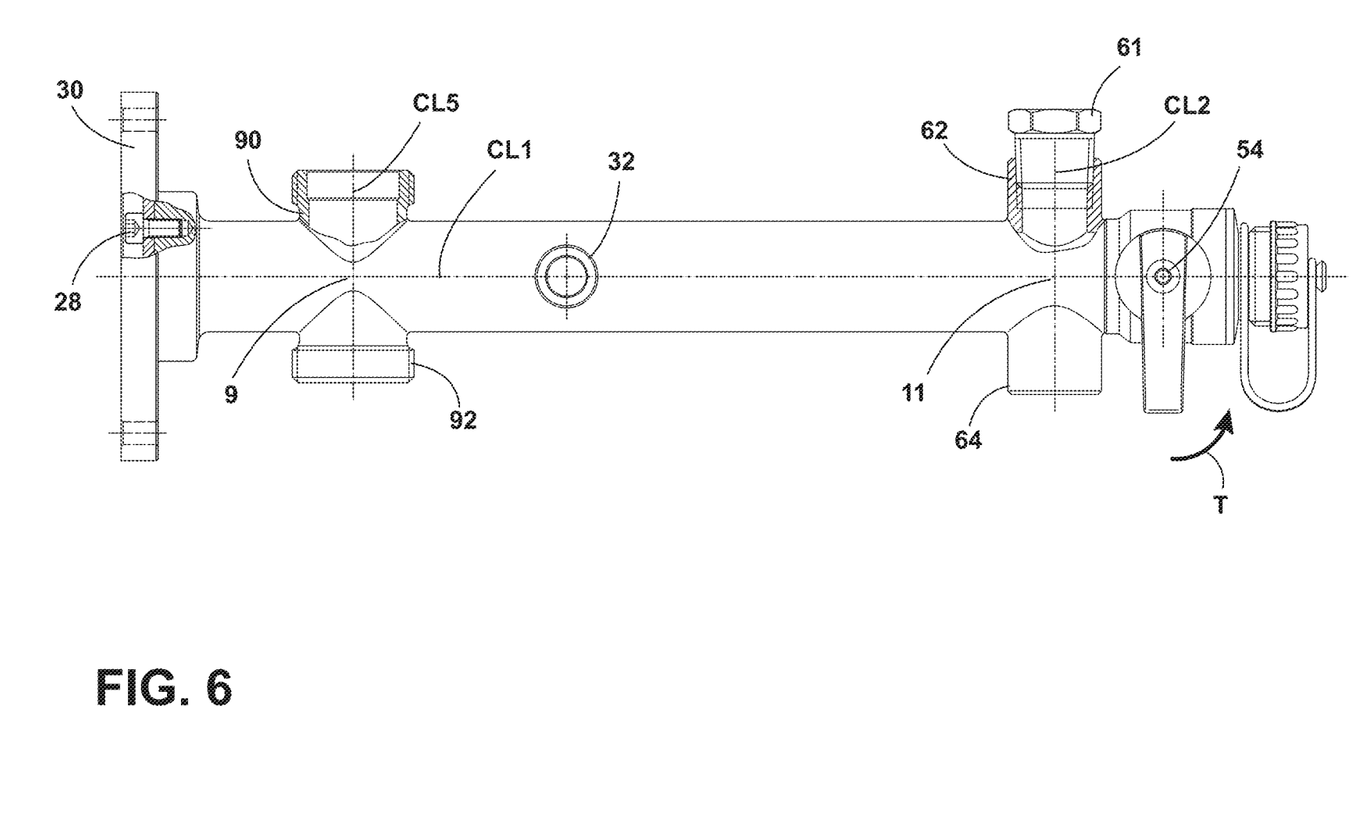
FIG. 6 is a partial cross-sectional view of the isolation mounting arm shown in FIGS. 1 and 2.
Figure 8:
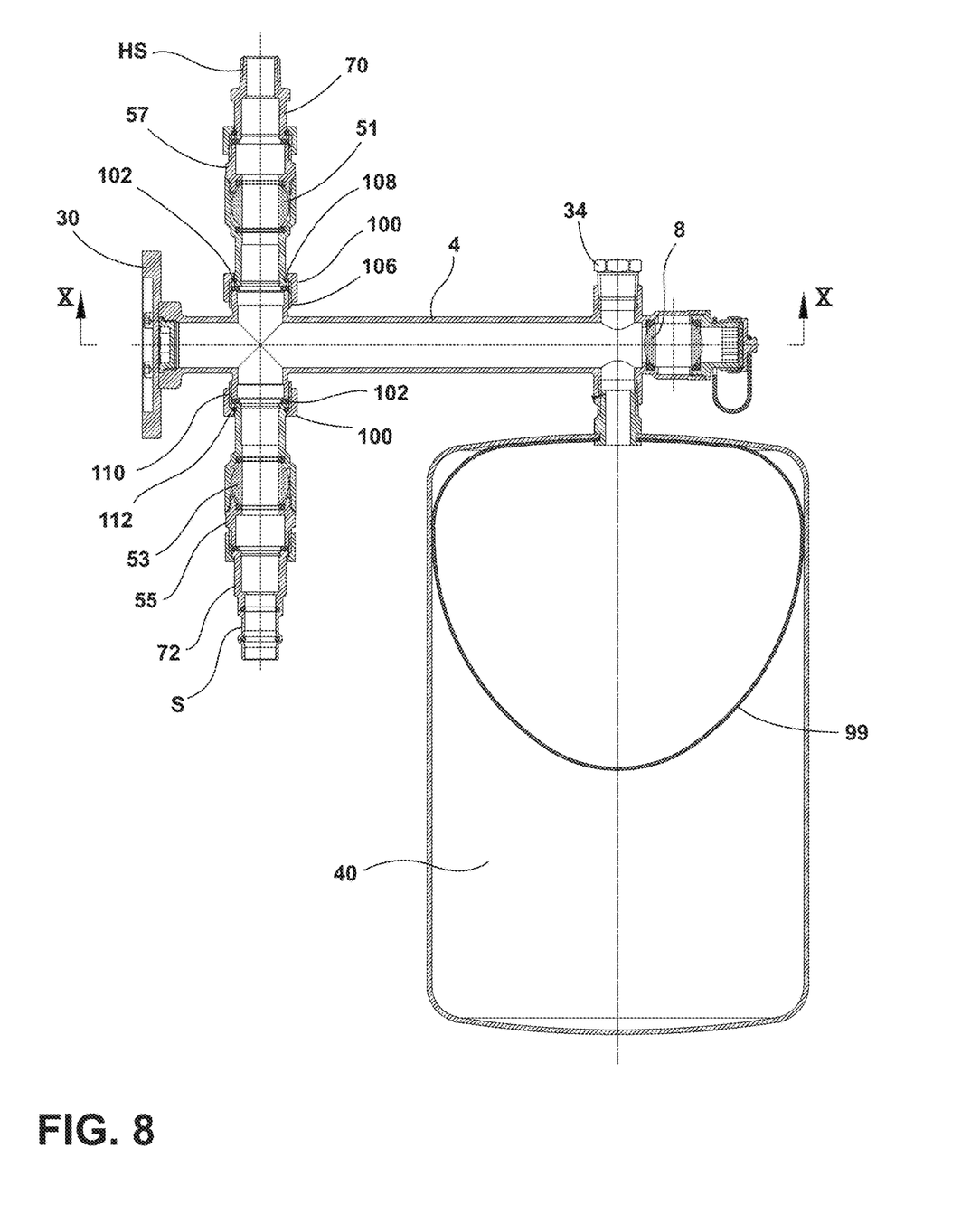
FIG. 8 is a front cross-sectional view of the hydronic expansion tank assembly shown in FIG. 2 with additional plumbing components coupled to the ports of the first tee.
Figure 9:
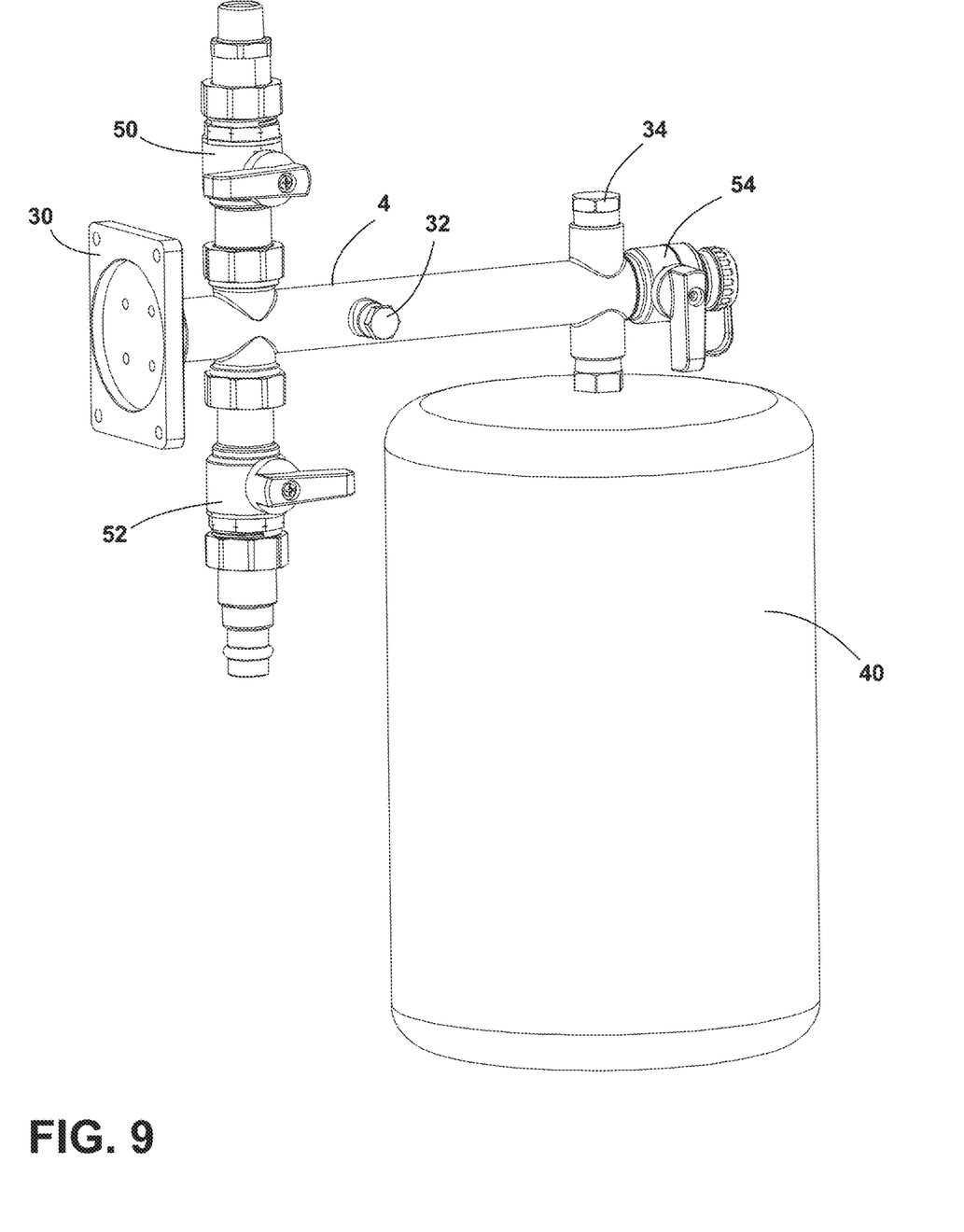
FIG. 9 is a front perspective view of the hydronic expansion tank assembly shown in FIG. 8.
Figure 10:
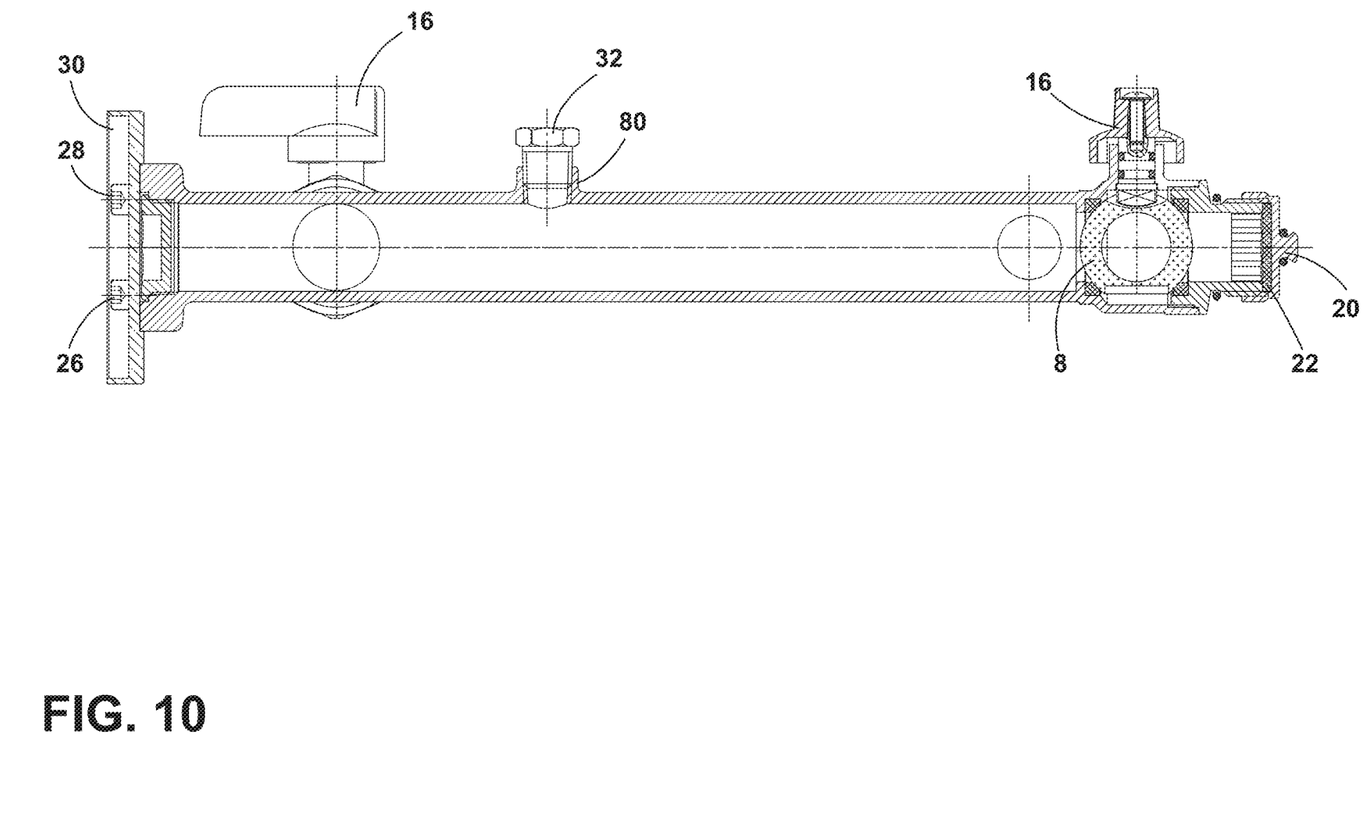
FIG. 10 is a cross-sectional view of the isolation mounting arm taken along line X-X shown in FIG. 8.

A hydronic expansion tank assembly 2 is illustrated in FIGS. 1, 2, 4, 8, and 9. The hydronic expansion tank assembly 2 can include an expansion tank 40, having bladder 99, in either a top-mount position (FIGS. 1 and 4) or a bottom-mount position (FIGS. 2, 8, and 9). The hydronic expansion tank assembly 2 includes an isolation mounting arm 4 that has a first end portion 3, a second end portion 5, and a medial portion 7, as illustrated in FIGS. 3 and 5. The isolation mounting arm 4 includes a fluid passageway P that extends from the first end portion 3 through the medial portion 7 to the second end portion 5, as shown in FIG. 3. The isolation mounting arm 4 includes a first tee 9 located in the first end portion 3 with oppositely disposed first and second ports 90 and 92. The isolation mounting arm 4 also has a second tee 11 located in the second end portion 5 with oppositely disposed fourth and fifth ports 62, 64. The isolation mounting arm 4 includes a third port 80 that can receive a plug 32 or a pressure gauge (not shown). The third port 80 can be threaded to assist in the installation of the plug 32 or pressure gauge.

The isolation mounting arm 4 can be made of any suitable material and can be a unitary piece. In the illustrated embodiments, the isolation mounting arm 4 is made from brass and is a unitary piece.

The hydronic expansion tank assembly 2 includes a first valve member 50 that is coupled to the first port 90. A second valve member 52 is coupled to the second port 92. An integral third valve member 54 is positioned adjacent to the drain port 13. As illustrated in FIG. 3, third valve member 54 includes a ball 8 that is positioned within the fluid passageway P of the isolation mounting arm 4. Sealing ring 10 is located around the ball 8 of the third valve member 54. The sealing ring 10 can be a single sealing member or multiple components. The third valve member 54 includes a stem 12 that is coupled to the ball 8. The stem 12 can be actuated in direction T by a handle 16. O-rings 14 seal the stem 12 within the stem opening 15 in the isolation mounting arm 4. The handle 16 is coupled to the stem 12 by a screw 18.

The drain port 13 can be integrally formed as part of the isolation mounting arm 4 or can include, as shown in FIG. 3, a separate bonnet 6 that is coupled to the second end portion 5 of the isolation mounting arm 4. In the illustrated embodiment, the bonnet 6 includes a cap 20 with a sealing gasket 22 that seals the end of the drain port 13. The cap 20 can be connected to the drain port 13 by a buckle 24.

Figure 7:
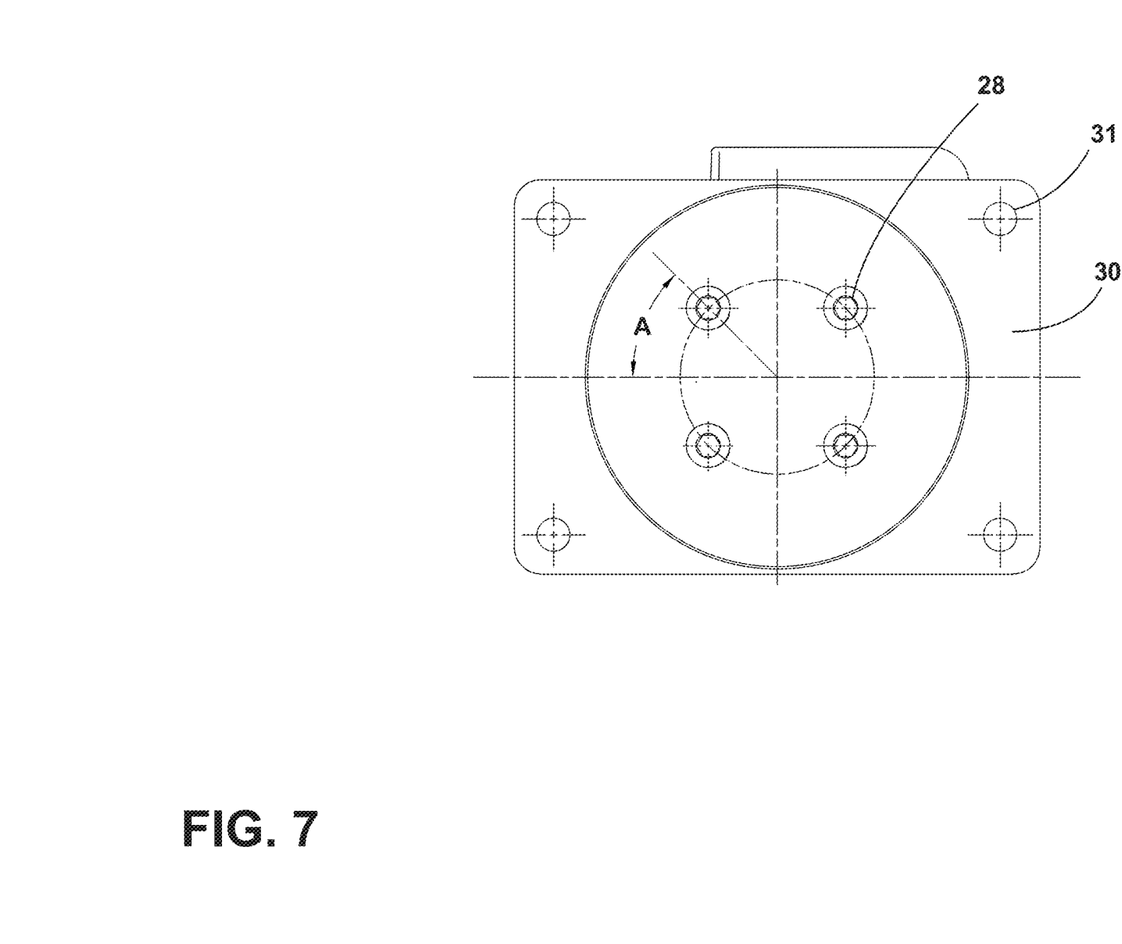
FIG. 7 is a side elevational view of the isolation mounting arm shown in FIG. 1.

The isolation mounting arm 4 can have a flange F at the terminal end of first end portion 3. The flange F can include integrally or as a separate component a square base 30, which can be secured to a wall or other vertical structure. Screws can be used to secure the square base 30 to the wall or vertical structure through openings 31 in square base 30 (FIG. 7). A seal 26 can be positioned integrally or as a separate member, as shown in FIG. 3, within the fluid passageway P at the flange F of the isolation mounting arm 4. In the illustrated embodiment, fasteners 28 are used to couple the seal 26 to the square base 30. The securing of the square base 30 to a vertical structure helps support the weight of the isolation mounting arm 4 and the tank 40.

While the fluid passageway and stem opening 15 of third valve member 54 are shown as integrally formed within the isolation mounting arm 4, the first valve member 50 and second valve member 52 are illustrated as separate components that are coupled to the first port 90 and second port 92 of the isolation mounting arm 4. The first valve member 50 and second valve member 52 similarly include a ball 8 that is positioned within the fluid passageway in a manner similar to third valve member 54. The seals, stem, handle, etc. for the first valve member 50 and second valve member 52 can be the same as the third valve member 54. The first port 90 and second port 92 can include integrally formed extensions that receive the ball 8 of the first and second valve members 50, 52, respectively. Alternatively, as illustrated in FIG. 8, the first port 90 and second port 92 can couple with additional plumbing components to connect to the first valve member 50 and second valve member 52, respectively. In the illustrated embodiment, the first port 90 and second port 92 are male threaded ports for installing the first valve member 50 and second valve member 52 using couplings. In the illustrated embodiment, the first port 90 and the second port 92 are G male threaded ports for installing the G female union of the valve members (50, 52). The union member arrangement permits the rotation of the valve members 50, 52 for different positioning of the handles 16 depending upon space or other constraints. The valve members 50, 52 can include a variety of other connections on the other end of the valve member (50, 52) to connect to male iron pipe, female iron pipe, press, sweat, PEX, push-to-connect, or other fittings.

In the illustrated embodiment, the second port 92 couples to the second valve member 52, which then couples to the incoming fluid supply line S, shown in FIG. 8. The first port 90 couples to the first valve member 50 which couples to the supply line HS for supplying the hydronic system, as shown in FIG. 8. The centerline CL1 of the fluid passageway P generally intersects at about a 90 degree angle with the centerline CL5 of the first tee 9, the centerline CL2 of the second tee 11, and the centerline CL4 of the third port 80. In the illustrated embodiment, centerlines CL5 and CL2 are generally parallel and at about a 90° angle to centerlines CL3 and CL4, as the third port 80 and the third valve member 54 are illustrated on the side of the isolation mounting arm 4 when the first port 90, second port 92, fourth port 62, and fifth port 64 are on the top and bottom of the isolation mounting arm 4. A direct mount air separator (not shown) may be connected to the first port 90 instead of the first port 90 being connected to the supply line HS for the closed loop hydronic system.

The relative positioning of the various components along the isolation mounting arm 4 is illustrated in FIG. 1. The distance L1, which represents the distance from the terminal end of the square base 30 to the centerline CL5 of the first tee 9 is approximately 63 mm. The distance L2, measured from the terminal end of the square base 30 to the centerline CL4 of the third port 80 is approximately 121 mm. The distance L3, measured from the terminal end of the square base 30 to the centerline CL2 of the second tee 11, is approximately 253.5 mm. The distance L4, measured from the terminal end of the square base 30 to the center of the third valve member 54, is approximately 283 mm. The distance L5, measured from the terminal end of the square base 30 to the terminal end of the cap, is approximately 327.2 mm. The length L6 and the width L7 of the tank 40 are approximately 320.68 mm and 203.2 mm, respectively, in the illustrated embodiment. The relative spacings of these components provides a relatively compact design for the hydronic expansion tank assembly 2 without having the tank 40 interfere with the incoming supply line S, the outgoing supply line HS (or alternatively the air separator) while permitting the tank 40 to be easily installed in a top or bottom mount manner.

In addition, the drain port 13 remains accessible for purging the tank 40 by actuation of the valve members 50, 52, and 54. For example, the second valve member 52 can be shutoff to prevent entry of fluid from the supply line S into the isolation mounting arm 4 while permitting the opening of the third valve member 54 to purge the tank 40 and the supply HS to the hydronic system depending upon whether the first valve member 50 is opened or closed. When the first valve member 50 is open, the supply HS to the hydronic system could also be purged. When both the first valve member 50 and second valve member 52 are closed, the third valve member 54 may be opened to purge the tank 40 and/or to reduce the pressure in the system, if necessary, depending upon readings taken from the pressure gauge that can be coupled to the third port 80. The draining or purging of the tank 40 can be done without removal of the tank 40.

As illustrated in FIGS. 1 and 2, the positioning of the expansion tank 40 can be in a top-mount or bottom-mount position. Fourth port 62 and fifth port 64 include threaded openings to receive the threaded portion 60 of the tank 40 or the threaded plug 34. The port opposite the expansion tank 40 is illustrated as plugged with plug 34, as illustrated in FIGS. 1 and 2. However, instead of a plug 34, a gauge, automatic air vent, or other component could be coupled to the port (62, 64) that is opposite the tank 40. For example, the tank 40 could be coupled to port 64 with an adapter coupled to port 62 for installing a pressure gauge, temperature gauge, or air vent.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second components, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An expansion tank assembly, comprising:
   a body having a passageway with a first end portion, a second end portion, and a medial portion located between said first end portion and said second end portion, including:
   a flange at a terminal end of said first end portion;
   a first tee located in said first end portion, said first tee including oppositely disposed first and second ports;
   a third port located in the medial section;
   a drain port located at a terminal end of said second end portion;
   a second tee located in said second end portion, said second tee including oppositely disposed fourth and fifth ports;
   a first valve member coupled to said first port;
   a second valve member coupled to said second port;
   a third valve member located adjacent said drain port; and
   an expansion tank coupled to one of said fourth or fifth ports.

2. The expansion tank assembly of claim 1, further including a pressure gauge coupled to said body.

3. The expansion tank assembly of claim 1, wherein said flange portion of said body is coupled to a mounting bracket.

4. The expansion tank assembly of claim 3, further including a cap positioned in said passageway between said flange and said mounting bracket to close said passageway at said terminal end of said first end portion of said unitary body.

5. The expansion tank assembly of claim 1, further including an air vent coupled to said body.

6. The expansion tank assembly of claim 1, wherein said drain port includes a bonnet coupled to said terminal end of said second end portion of said body.

7. The expansion tank assembly of claim 1, wherein said first valve member, said second valve member, and said third valve member are all ball valves.

8. The expansion tank assembly of claim 1, wherein said body is made from brass.

9. The expansion tank assembly of claim 1, wherein said first port supplies a closed loop hydronic system and said second port couples to the fluid supply line.

10. A plumbing assembly for a hydronic system with an expansion tank, comprising:
- an isolation mounting arm having a fluid passageway with a first end portion, a second end portion, and a medial portion located between said first end portion and said second end portion, including:
  - a mounting bracket at the terminal end of said first end portion;
  - a first tee located in said first end portion, said first tee including oppositely disposed first and second ports;
  - a third port located in the medial section;
  - a drain port located at the terminal end of said second end portion;
  - a second tee located in said second end portion, said second tee including oppositely disposed fourth and fifth ports;
- a first valve member coupled to said first port;
- a second valve member coupled to said second port; and
- a third valve member adjacent to said drain port.

11. The plumbing assembly of claim 10, including an expansion tank coupled to said fourth or said fifth port.

12. The plumbing assembly of claim 10, including a pressure gauge coupled to said isolation mounting arm.

13. The plumbing assembly of claim 10, including an air vent coupled to said isolation mounting arm.

14. The plumbing assembly of claim 10, including an air separator coupled to said first valve member.

15. The plumbing assembly of claim 10, wherein said isolation mounting arm is brass.

16. A hydronic system, comprising:
- an incoming fluid supply line;
- a supply line for a hydronic system;
- an isolation mounting arm having a fluid passageway with a first end portion, a second end portion, and a medial portion located between said first end portion and said second end portion, including:
  - a first tee located in said first end portion, said first tee including a first port coupled to said supply line for the hydronic system and an oppositely disposed second port coupled to said incoming fluid supply line;
  - a third port located in the medial portion;
  - a drain port located at the end of said second end portion;
  - a second tee located in said second end portion, said second tee including oppositely disposed fourth and fifth ports;
- a first valve member coupled to said first port;
- a second valve member coupled to said second port; and
- a third valve member adjacent to said drain port.

17. The hydronic system of claim 16, including an expansion tank coupled to either of said fourth or said fifth ports.

18. The hydronic system of claim 16, including a mounting bracket coupled to said first end portion of said isolation mounting arm.

19. The hydronic system of claim 16, including an air vent and a pressure gauge coupled to said isolation mounting arm.

20. The hydronic system of claim 16, wherein said first and second ports include coupling sleeves to couple the first and second ports to the first and second valve members.

* * * * *